United States Patent
Koelblin et al.

[11] Patent Number: 5,871,427
[45] Date of Patent: Feb. 16, 1999

[54] MACHINE TOOL

[75] Inventors: Rolf Koelblin, Remscheid; Reinhard Schneider, Bergneustadt, both of Germany

[73] Assignee: Honsberg Lamb Sonderwerkzeugmaschinen GmbH, Remscheid, Germany

[21] Appl. No.: 894,341
[22] PCT Filed: Oct. 19, 1996
[86] PCT No.: PCT/EP96/04551
   § 371 Date: Aug. 15, 1997
   § 102(e) Date: Aug. 15, 1997
[87] PCT Pub. No.: WO97/25181
   PCT Pub. Date: Jul. 17, 1997

[30] Foreign Application Priority Data
Jan. 5, 1996 [DE] Germany ............... 196 00 274.5

[51] Int. Cl.⁶ .................................................. B23Q 3/157
[52] U.S. Cl. .......................... 483/48; 483/31; 483/32; 483/38
[58] Field of Search ............... 483/36, 31, 47, 483/32, 60, 38, 39, 69, 62, 41, 48, 49, 51

[56] References Cited

U.S. PATENT DOCUMENTS

| | | | |
|---|---|---|---|
| 3,895,427 | 7/1975 | Nakao et al. | 483/32 |
| 4,759,115 | 7/1988 | Kielma | 483/32 |
| 5,250,017 | 10/1993 | Ariyoshi | 483/31 X |
| 5,462,511 | 10/1995 | Sheldon et al. | 483/38 X |

FOREIGN PATENT DOCUMENTS

| | | | |
|---|---|---|---|
| 3404838 | 8/1984 | Germany | 483/32 |
| 272410 | 11/1988 | Japan | 483/32 |

*Primary Examiner*—William R. Briggs
*Attorney, Agent, or Firm*—Diller, Ramik & Wight, PC

[57] ABSTRACT

The machine tool comprises a machine stand (10) with a vertically movable vertical carrier (12) carrying a spindle head (SK1) for treatment of a workpiece. To exchange the spindle head (SK1) against a new spindle head (SK2), an exchange unit (15) is provided, comprising an exchange arm (16) pivotable by 90° about a vertical axis (37). Two holding couplings (17,18) are mounted above each other on the exchange arm (16), each adapted to carry a spindle head (SK1,SK2). A delivery means (21), gripping the spindle heads from above, is used to supply the spindle heads for transfer to the exchange unit (15). The exchange unit (15) grips the spindle heads from the side. By pivoting the exchange arm (16) over 90°, the spindle head is pivoted to a position in front of the machine stand (10) and thus can be taken over by the vertical carrier (12).

10 Claims, 4 Drawing Sheets

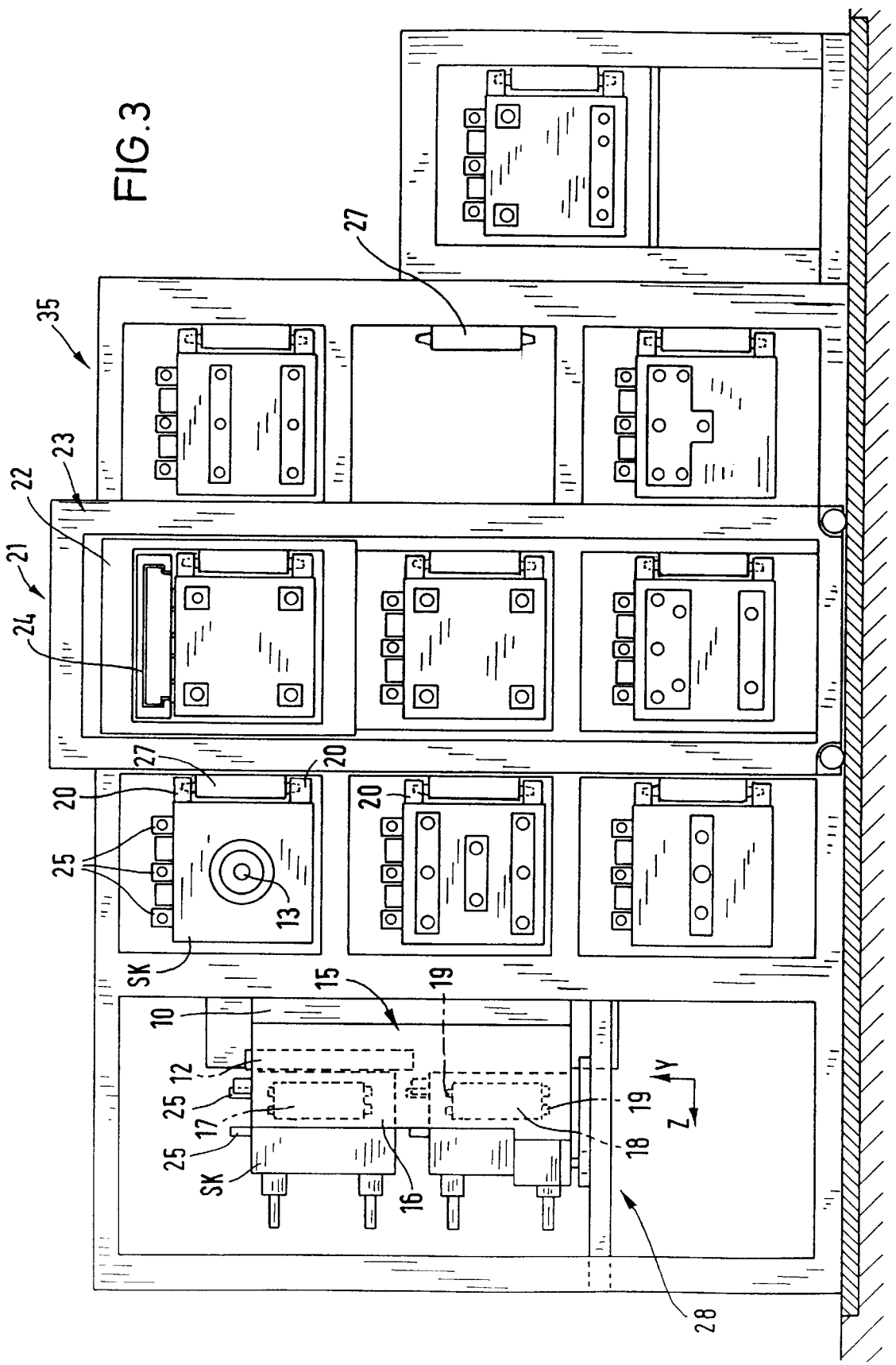

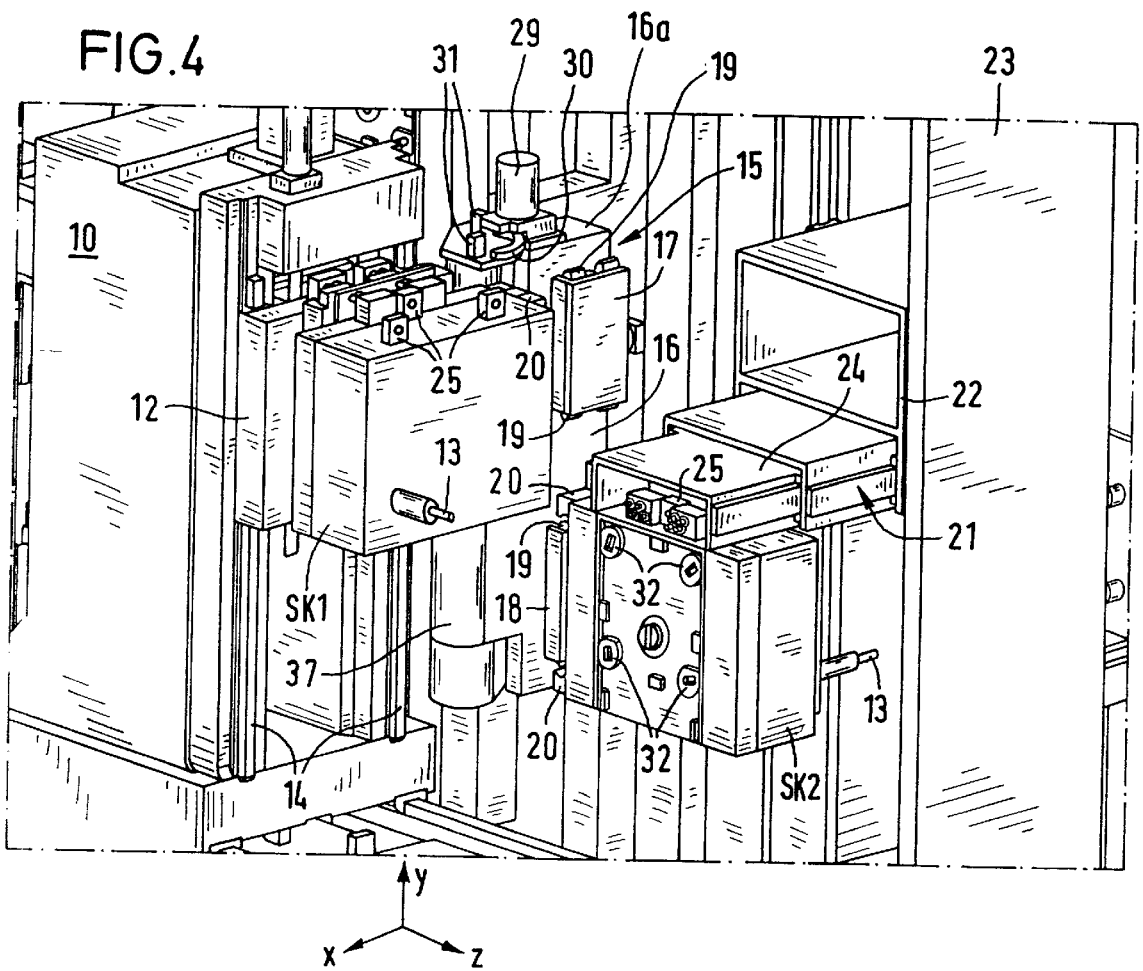

MACHINE TOOL

BACKGROUND OF THE INVENTION

The present invention relates to a machine tool of the type comprising a machine stand and a changeover device for the exchanging of spindle heads fastened to a vertical carrier of the machine stand to perform treatment of a workpiece.

From DE 39 18 902 A1, a machine tool is known wherein the spindle head fastened to a vertical carrier can be exchanged. For this purpose, a changeover device is mounted to the machine stand, comprising two exchange arms pivotable by respectively 180°. Each exchange arm can grip the upper end of a spindle head delivered from a magazine and, through a pivoting movement of 180°, position the spindle head adjacent the vertical carrier, so that the spindle head can be transferred to the vertical carrier to be locked thereon. The spindle head suspended on the exchange arm can be turned by 90° relative to the exchange arm in such a manner that the tools projecting from the exchange arm, which in their operating position are oriented in the forward direction from to the machine stand, upon transfer to the spindle head magazine will project from the machine stand in a lateral direction. To allow a quick exchange of the spindle heads, two exchange arms are required, one exchange arm removing the spindle head from the vertical carrier while the other exchange arm supplies a new spindle head to the vertical carrier. Such an arrangement requires a high technical expenditure for the exchange arms. The spindle head magazine must extend to both sides of the machine stand and necessitates a complex transport mechanism.

Further, in a machine tool known from EP 0 204 151 B1, the spindle heads are suspended on a head exchange unit arranged on the machine stand for rotation about a vertical axis. The spindle heads are seized from above and pivoted to a position above the moving path of the vertical carrier which then will take over the spindle heads. This construction makes it necessary to provide a head exchange unit with a large turning radius on the machine stand, and the outwardly projecting spindle heads and tools require considerable space.

In a machine tool known from DE 92 02 245 U1, the machine stand is arranged next to a transfer station. The machine stand supports a vertical carrier which is movable in a vertical direction and is provided with an exchange arm pivotable about a horizontal axis. On the transfer station, two transfer sites are arranged above each other, each of them adapted to receive one spindle head. The exchange arm is laterally pivoted towards one of the two spindle heads and then pulls the spindle head horizontally to the vertical carrier. For exchange of the spindle heads, not only a vertical movement of the vertical carrier but also several reciprocating movements of the exchange arm must be performed. Additionally, it is required that the spindle heads at the transfer station and on the vertical carrier be guided in vertical guide bars, while a wide gap must be bridged for transfer of the spindle heads.

SUMMARY OF THE INVENTION

It is an object of the invention to provide a machine tool wherein the exchange unit requires little space and is adapted to perform an exchange of the spindle heads by a simple moving sequence and within a short time.

According to the instant invention, the above object is solved by the features indicated in claim 1.

In the machine tool according to the invention, the exchange arm comprises two holding couplings arranged above each other and provided for respectively one spindle head, and the vertical carrier is movable to the transfer height of each of the holding couplings. The exchange arm can be pivoted about a vertical axis into a transfer position in which the holding coupling of the exchange arm is pivoted to a spindle head placed on the vertical carrier. The same exchange arm has the new spindle head attached thereon, which will be positioned below or above the spindle head to be replaced. During the transfer of the old spindle head to the exchange arm, the new spindle head still remains connected to the exchange arm. Once the vertical carrier has transferred the old spindle head to the exchange arm, the vertical carrier is moved vertically into alignment with the new spindle head which then will be transferred to the vertical carrier. In this manner, only one pivoting movement of the exchange arm into the transfer position, followed by a reverse pivoting movement, is required for performing a complete exchange of spindles.

Preferably, the exchange unit is arranged separately from the machine stand, with the machine stand being movable in the forward direction relative to the exchange unit. In the context of the instant description, the forward direction is the direction of the machine stand advance axis (Z-axis) in which the tools of the spindle head on the vertical carrier are oriented. It is generally possible to put the machine stand to a standstill and to move the exchange unit. Since the machine stand is usually movable in the direction of the Z-axis anyway, the exchange unit is preferably fixed. The movement in the Z-direction is suitable to completely release a spindle head from its engagement with the vertical carrier after transfer of the spindle head to the exchange unit. When the vertical carrier has then been moved to the transfer position for the new spindle head, the machine stand is advanced so that the vertical carrier can reliably seize the new spindle head. This advance and return movement of the machine stand is always performed only over a very short travelling distance which is required to remove the vertical carrier from the spindle head that transferred the exchange unit.

Preferably, the exchange arm is pivotable by only 90°, the delivery means passing the spindle head over to the exchange arm with the tools facing laterally away from the machine stand. This means that the exchange arm performs exclusively a pivoting movement while simultaneously pivoting the spindle head suspended thereon by 90°. The front side of the spindle head, i.e. the side having the tools projecting therefrom, will then be laterally facing away from the machine stand in the direction of the horizontal x-axis. In this orientation, the spindle heads can be removed from the machine stand and be transferred into a spindle head magazine. This configuration offers the advantage that the front sides of the spindle heads and the tools projecting therefrom can be easily checked and visually observed since they are accessible to the maintenance staff from one side of the machine tool. Further, on this side, an automatically operated tool monitoring device can be arranged. The whole movement and storage of the spindle heads takes place in the above orientation, with the tools oriented in the direction of the X-axis of the machine stand.

Preferably, the holding couplings of the exchange arm are provided to engage holding portions arranged in a side wall of each spindle head. This allows for a considerably less complex design because the exchange arm can be shaped as a plate and does not need projecting portions gripping the spindle head from above. As a result, the exchange unit can be given particularly compact and space-saving dimensions.

On the other hand, the delivery means, provided to deliver the spindle heads to the exchange unit and again remove them from the exchange unit, can have a holding coupling for engagement with holding portions formed on the upper side of the spindle head. Thus, while the exchange unit engages holding portions arranged laterally on the spindle head, the delivery means engages holding portions arranged on the upper side of the spindle head. In this manner, the coupling systems of the exchange unit and the delivery means are functionally and spatially separated from each other and thus will neither influence nor disturb each other.

According to a preferred embodiment of the invention, the delivery means comprises a lift which can be moved to the transfer height of each of the two holding couplings of the exchange unit. This lift supports a horizontal carrier arranged for linear movement in parallel to the front plane of the machine stand, i.e. in the X-direction. In this manner, the delivery means can insert the spindle head by a linear movement into the holding coupling of the exchange unit arranged in its waiting position. This movement can be performed quickly and with low noise.

According to a further embodiment of the invention, the carrier is arranged on a carriage which can be moved in parallel to the forward direction of the machine stand, i.e. in the direction of the Z-axis, for servicing a shelf magazine. This carriage makes it possible for the delivery means to service both the shelf magazine and the exchange unit. The lift is used for movement not only to the respective transfer height on the exchange unit but also to the height of the compartment of the shelf magazine which is to be serviced. The horizontal carrier is used for the movement into the compartments of the shelf magazine and for the advancing of the spindle heads to the exchange arm in its waiting position.

A preferred embodiment of the invention will be explained in greater detail hereunder with reference to the drawings.

BRIEF DESCRIPTION OF THE DRAWINGS

FIG. 3 shows a side view from the direction of the arrow III in FIG. 1; and

FIG. 4 shows a perspective view illustrating an exchange process for exchanging an old spindle head against a new spindle head.

DESCRIPTION OF THE PREFERRED EMBODIMENT

Figure 2:
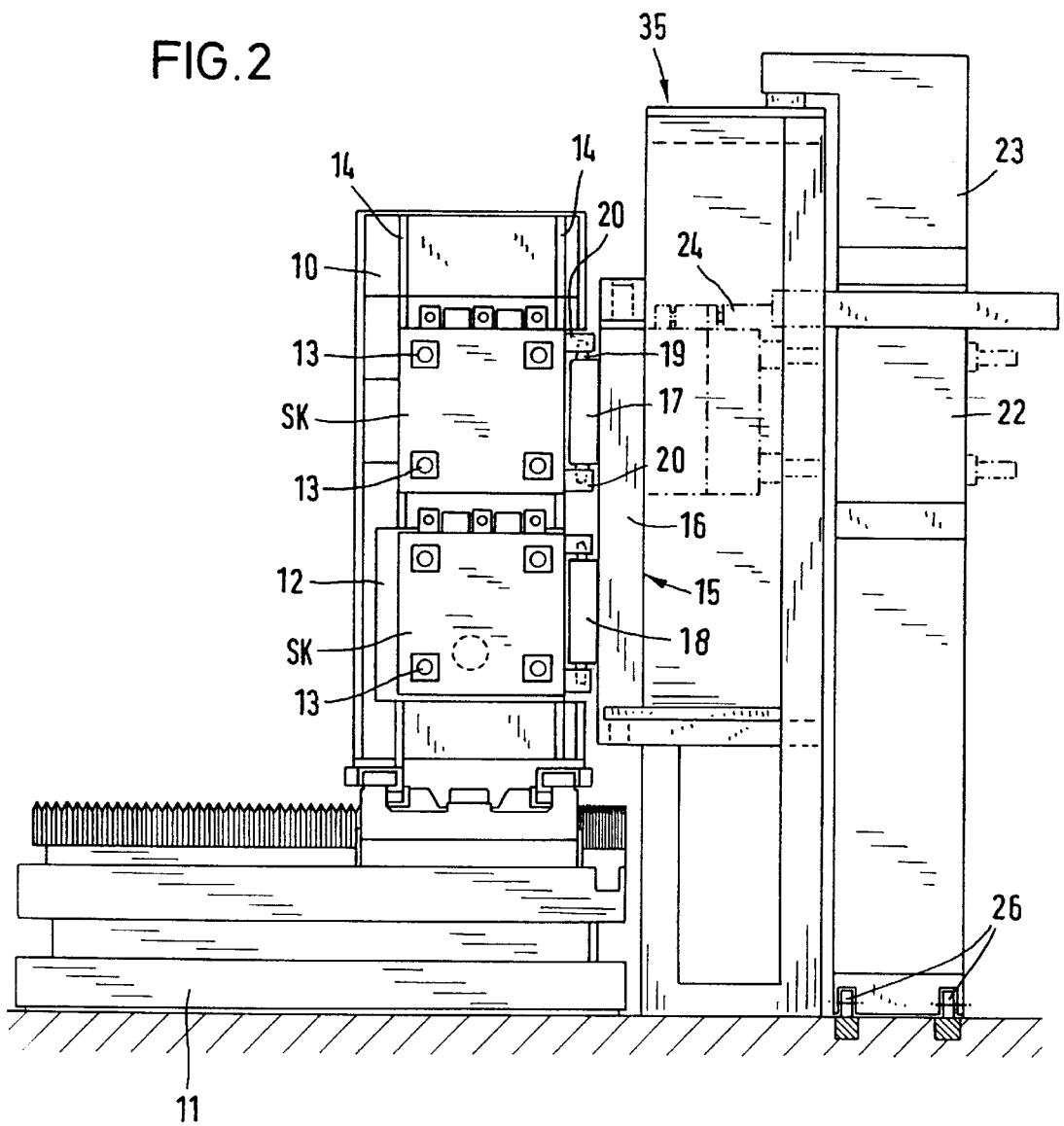
FIG. 2 shows a front view from the direction of the arrow II in FIG. 1.

The machine tool comprises a machine stand 10 which, by means of a sliding carriage (not shown), is movable in the direction of the X-axis on the machine base 11. Machine stand 10 is also movable in the front direction, i.e. in the direction of the Z-axis. The movability of machine stand 10 in the direction of the X-axis is not absolutely necessary. On the front side of machine stand 10, a vertical carrier 12 is arranged for movement in a vertical direction (in the direction of the Y-axis). Attached on vertical carrier 12 is the spindle head SK which on its front side is provided with tools 13 for treatment of a workpiece (not shown). These tools 13 are e.g. drilling or milling devices which are rotatably driven. The tools 13 can be exchanged on spindle head SK. Spindle head SK contains a holding fixture and a drive gear for the rotatory drive of tools 13. The tools are driven from the interior of machine stand 10 via vertical carrier 12. Vertical carrier 12 is provided with a holding means arranged to grip the spindle head SK and hold it in a defined position on vertical carrier 12. Vertical carrier 12 can be displaced on machine stand 10 along vertical guide rails 14 illustrated in FIG. 2.

The exchange unit 15 is arranged in a fixed position on machine base 11 on the one end of the moving path of machine stand 10 in the X-direction. Exchange unit 15 comprises an exchange arm 16 which is pivotable by 90° about a vertical axis 37. Exchange arm 16 can be pivoted into the waiting position 16a wherein it extends in parallel to vertical carrier 12, and into a transfer position 16b wherein it extends at a right angle to vertical carrier 12, i.e. in the direction Z-axis. Two holding couplings 17,18 are arranged above each other on exchange arm 16. Each of the holding couplings 17,18 comprises a block from which clamping portions 19 are simultaneously extendable upwardly and downwardly. Each clamping portion 19 comprises a prism-shaped centering element adapted to engage a complementary holding portion 20 of spindle head SK to hold and lock the spindle head SK in its exact position on holding coupling 17. The holding portions 20 are horizontal bars arranged on a side wall of spindle head SK and formed to have the coupling means 17 or 18 fittingly engage therebetween in the retracted state of the clamping portions 19. When the clamping portions 19 are extended, they enter the holding portions 20 and thus fixeldly hold the spindle head SK on the coupling means 17 and 18, respectively.

The transport of the spindle heads SK to and from the holding couplings 17,18 is performed by the delivery means 21. Delivery means 21 comprises a lift 22 vertically displaceable on a carriage 23. Lift 22 has a horizontal carrier 24 mounted thereon which is movable in the direction of the X-axis and in the illustrated embodiment is provided as a telescopic slide with a plurality of telescopic elements. Horizontal carrier 24 engages, by means of a holding coupling (not shown), holding members 25 provided on the upper side of spindle head SK. Lift 22 is used for moving the horizontal carrier 24 to the respective transfer height of holding couplings 17 or 18. Then, horizontal carrier 24 is extended, and spindle head SK is moved along the holding couplings 17,18 until reaching the transfer position. In the transfer position, the clamping portions 19 are extended out of the holding couplings 17 and 18, respectively to engage holding portions 20. Subsequently, the holding couplings of the horizontal carrier 24 are released so that the horizontal carrier 24 can be returned without the spindle head.

The shelf magazine 35 for depositing the spindle heads is arranged laterally of machine stand 10 in the Z-direction. On the side of shelf magazine 35 facing away from machine stand 10, guide rails 26 are arranged to have the carriage 23 running thereon; thus carriage 23 will move along the outer side of shelf magazine 35. An additional guide rail is arranged on the upper edge of shelf magazine 35. Shelf magazine 35 comprises a large number of compartments wherein the spindle heads SK can be suspended. Each compartment includes a holding means 27 (FIG. 3) which has the holding portions 20 of a deposited spindle head SK gripping therearound and which holds the spindle head in a manner similar to the holding couplings 17,18. The holding means 27 are each fastened to a side wall of shelf magazine 35. When lift 22 of carriage 23 moves towards a shelf compartment, the horizontal carrier 24 can be entered into the shelf compartment to engage the holding members 25 on the upper side of spindle head SK and thus take the spindle head SK out of the shelf compartment. Then, spindle head SK will be retracted into carriage 23 and moved into the transfer station 28 arranged at the end of shelf magazine 35.

Arranged within transfer station 28 is the exchange unit 15 whose exchange arm 16 can take over the spindle head SK.

FIG. 4 illustrates the condition wherein the vertical carrier 12 of machine stand 10 carries a spindle head SK1—hereunder briefly referred to as an "old spindle head"—which is to be exchanged for a "new spindle head" SK2. Spindle head SK2 has been taken out of the shelf magazine 35 by delivery means 21. Subsequently, carriage 23 has been moved to transfer station 28. When lift 22 has been moved to the transfer height of the lower holding coupling 18, horizontal carrier 24 has been extended, with the holding portions 20 of spindle head SK2 gripping from above and below—the holding coupling 18 of the exchange arm 16 which has been pivoted into its transfer position. Then, holding coupling 18 is actuated to extend the clamping portions 19 and have them engage the holding portions 20. Once spindle head SK2, arranged in its transfer position, has been taken over by exchange arm 16, it is released from the horizontal carrier 24 which then is retracted into lift 22. Now, exchange arm 16 is pivoted by 90° about the vertical axis 37. This is performed by a drive motor 29, arranged on the upper side of exchange arm 16, which has a pinion engaging a ring gear 30 seated on the upper end of the stationary and non-rotating axis 37. The pivoting movement is limited, by two stoppers 31, to exactly 90°. At the end of the pivoting movement, spindle head SK2 is arranged in parallel to carrier 12 in front of machine stand 10. The moving range of vertical carrier 12 on machine stand 10 has such a vertical dimension that both spindle heads SK1 and SK2 can be positioned above each other in front of machine stand 10.

Figure 1:
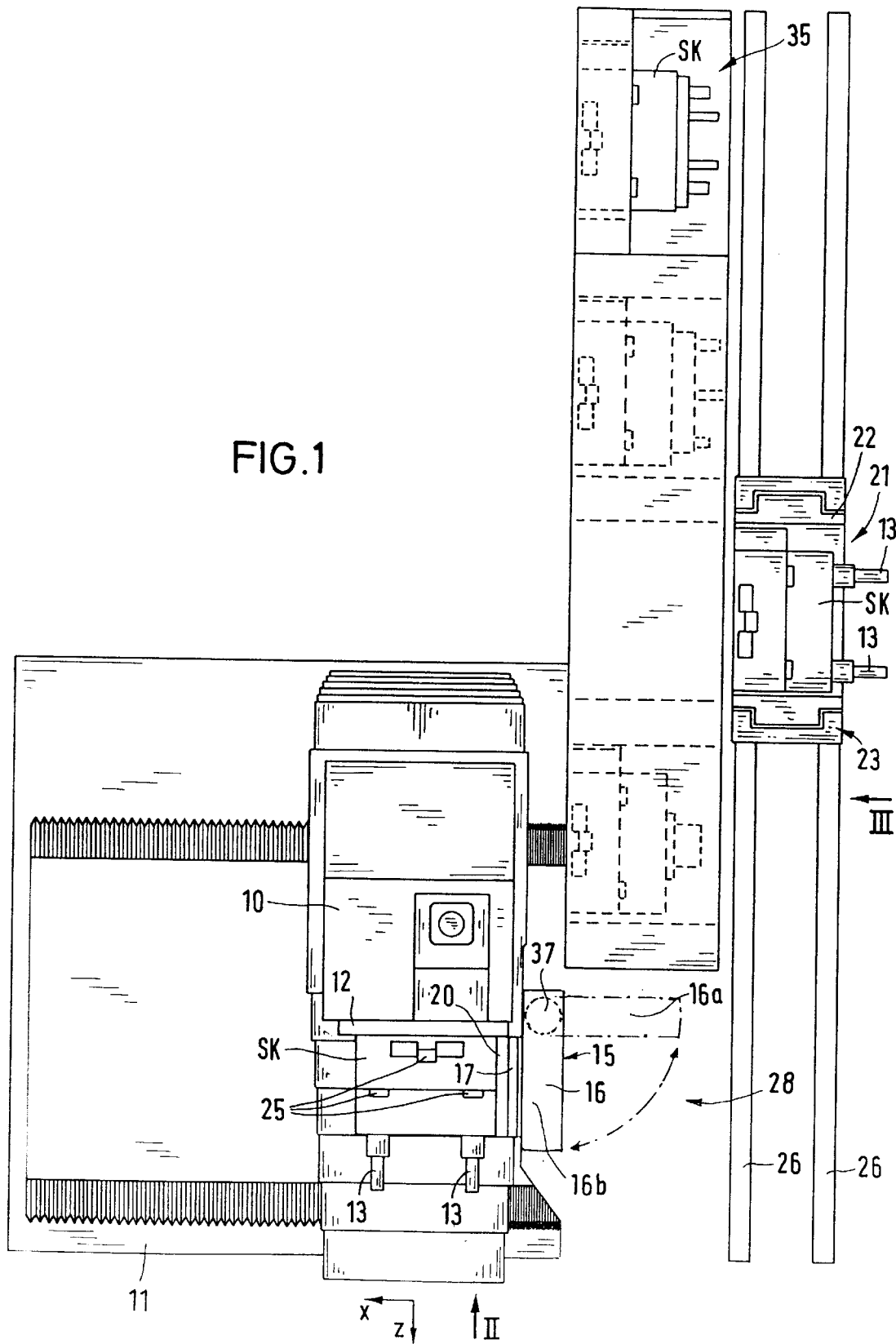
FIG. 1 shows a plan view of the machine tool.

While exchange arm 16*a* is arranged in the transfer position 16*b* (FIG. 1), it holds the new spindle head SK2 fixed in position, and in this position, its other holding coupling 17 is already arranged between the holding portions 20 of the other spindle head SK1. Now, by extending the clamping portions 19 from the holding coupling 17, also the old spindle head SK1 is taken over by exchange arm 16 and shortly afterwards is released from vertical carrier 12. In this situation, both spindle heads SK1;SK2 are carried by exchange arm 16.

To release the vertical carrier 12 from its engagement with the old spindle head SKI and render the vertical carrier 12 free of spindle head SK1, machine stand 10 is moved back a short distance along the Z-axis. Then, vertical carrier 12 is lowered to the position of lower spindle head SK2, and machine stand 10 is again advanced a short distance so that the engagement members of vertical carrier 12 can enter the corresponding engagement portions 32 on the rear side of spindle head SK2 and the drive connection between vertical carrier 12 and spindle head SK2 is established. Once spindle head SK2 has been taken over by vertical carrier 12, spindle head SK2 is released from holding coupling 18.

Subsequently, exchange arm 16 together with the old spindle head SK1 is pivoted back into the waiting position 16*a* shown in FIG. 4. Lift 22 is raised to the upper takeover position, and horizontal carrier 24 is extended so as to seize spindle head SK1 by its upper holding members 25 and remove it from holding coupling 17 in the direction of the X-axis. In the process, the tools 13 of spindle head SK1 project laterally from machine stand in the direction of the X-axis. Already in the transfer station 28, the tools can be inspected and exchanged. At the transfer station 28, carriage 21 transports the spindle head SK2 into shelf magazine 35, with the movement of spindle head SK2 into magazine 35 being effected by extending the horizontal carrier 24.

Although a preferred embodiment of the invention has been specifically illustrated and described herein, it is to be understood that minor variations may be made in the apparatus without departing from the spirit and scope of the invention, as defined the appended claims.

We claim:

1. A machine tool comprising a machine stand (10) supporting a vertically movable vertical carrier (12) for attachment of a spindle head (SK), an exchange unit (15) including an exchange arm (16) pivotable about a vertical axis (37) and provided with a holding coupling (17, 18) for engagement with a spindle head (SK) delivered by delivery means (21) and for transfer of the spindle head to the vertical carrier (12), the exchange arm (16) includes two holding couplings (17, 18) arranged above each other and provided for coupling to respective spindle heads (SK, SK1, SK2), means for moving the vertical carrier (12) to the transfer height of each of the holding couplings (17, 18), the holding couplings (17, 18) of the exchange arm (16) are provided for engaging holding portions (20) arranged on a side wall of each spindle head (SK) each spindle head (SK) having holding members (32) at a backside of each of said spindle heads (SK), and said exchange arm (16) being pivotable to a transfer position (16*b*) in which a spindle head (SK) fixed to a holding coupling (17, 18) of said exchange arm (16) is positionable in front of said vertical carrier (12) in such a manner that engagement members of the vertical carrier (12) engage said holding members (32) at the backside of said spindle head (SK).

2. The machine tool according to claim 1, characterized in that the exchange unit (21) is arranged separately from the machine stand (10) and the machine stand (10) is movable in the forward direction (Z-axis) relative to the exchange unit (21).

3. The machine tool according to claim 1, characterized in that the exchange arm (16) is pivotable by 90° and the delivery means (21) passes the spindle head (SK) over to the exchange arm (16) with the tools (13) facing laterally away from the machine stand (10).

4. The machine tool according to claim 1, characterized in that the holding couplings (17,18) of the exchange arm (16) are provided to engage holding portions (20) arranged in a side wall of each spindle head (SK).

5. The machine tool according to any one of claims 1 to 4, characterized in that the delivery means (21) is provided with a holding coupling for engagement with holding portions (25) arranged on the upper side of the spindle head (SK).

6. The machine tool according to claim 1, characterized in that the exchange unit (15) is stationary, the delivery means (21) comprises a lift (22) which can be moved to the transfer height of each of the two holding couplings (17,18) of the exchange unit (15), and the lift (22) supports a horizontal carrier (24) which can be moved in parallel to the front plane of the machine stand (10) (in the direction of the X-axis).

7. The machine tool according to claim 6, characterized in that the lift (22) is arranged on a carriage (23) which can be moved in parallel to the forward direction of the machine stand (10) (in the direction of the Z-axis) for servicing a shelf magazine (35).

8. The machine tool according to claim 7, characterized in that the shelf magazine (35) includes storage compartments provided with holding means (27) engaging the lateral holding portions (20) of the spindle heads (SK).

9. The machine tool according to claim 4, characterized in that the holding couplings (17,18) of the exchange arm (16) comprise upwardly and downwardly extendable clamping portions (19) for centered engagement into the holding portions (20) of the spindle head (SK).

10. The machine tool according to claim 2, characterized in that the exchange arm (16) is pivotable by 90° and the delivery means (21) passes the spindle head (SK) over to the exchange arm (16) with the tools (13) facing laterally away from the machine stand (10).

* * * * *